(12) United States Patent
Hara

(10) Patent No.: US 6,781,760 B2
(45) Date of Patent: Aug. 24, 2004

(54) DISPLAY DEVICE

(75) Inventor: Koichi Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/200,245

(22) Filed: Jul. 23, 2002

(65) Prior Publication Data

US 2003/0025849 A1 Feb. 6, 2003

(30) Foreign Application Priority Data

Jul. 25, 2001 (JP) .................................... 2001-225059
Jul. 18, 2002 (JP) .................................... 2002-209318

(51) Int. Cl.⁷ ........................ G02B 27/10; G02F 1/1335
(52) U.S. Cl. ........................ 359/619; 359/621; 345/7; 349/95
(58) Field of Search ................. 359/619, 621, 359/630, 640; 349/56, 57, 95; 345/7–9

(56) References Cited

U.S. PATENT DOCUMENTS

| | | | | |
|---|---|---|---|---|
| 5,379,132 A | * | 1/1995 | Kuwayama et al. | 359/13 |
| 5,499,138 A | | 3/1996 | Iba | 359/569 |
| 6,061,179 A | * | 5/2000 | Inoguchi et al. | 359/464 |
| 6,407,724 B2 | * | 6/2002 | Waldern et al. | 345/8 |
| 2001/0054988 A1 | * | 12/2001 | Cone et al. | 345/7 |
| 2002/0075566 A1 | * | 6/2002 | Tutt et al. | 359/619 |
| 2002/0089467 A1 | * | 7/2002 | Hara | 345/4 |

FOREIGN PATENT DOCUMENTS

| | | | | |
|---|---|---|---|---|
| JP | 5-328261 | | 12/1993 | |
| JP | 6-43391 | | 2/1994 | |
| JP | 6-82934 | * | 3/1994 | 359/619 |
| JP | 10-170860 | | 6/1998 | |

* cited by examiner

*Primary Examiner*—Huy Mai
(74) *Attorney, Agent, or Firm*—Fitzpatrick, Cella, Harper & Scinto

(57) ABSTRACT

A display device includes a self-light-emitting image display that has pixels arranged two-dimensionally, micro light-emitting points that correspond to each pixel of the image display and exist in a part of the pixel, and a micro optical element that guides irradiated light from each of the micro light-emitting points arranged two-dimensionally. Optical axes connecting each of the micro light-emitting points and the micro optical element corresponding to the micro light-emitting point substantially intersect in a predetermined point closer than a near point of an eye, and the micro optical element is arranged so as to focus a virtual image of the micro light-emitting point corresponding to the micro optical element in a position that is a least distance of distinct vision or more apart from the predetermined point.

12 Claims, 7 Drawing Sheets

DISPLAY DEVICE

BACKGROUND OF THE INVENTION

1. Field of the Invention

The present invention relates to a display device that allows magnified observation of displayed contents with one eye. In addition, the present invention relates to a display device that is capable of switching nonmagnification display for observing a screen with binocular vision from a position that is a least distance of distinct vision or more apart from the screen and magnification display for observing a screen with one eye from a position closer to the screen than a near point of the eye as a display screen of an information technology device having a compact screen such as a mobile device and a cellular phone.

2. Related Background Art

A magnified observation method for a compact display screen with one eye (monocular vision) of this type has been used for a head mount display (HMD). However, it requires a large optical space for magnified observation and cannot perform nonmagnified observation of one screen with binocular vision at a normal remote distance.

FIG. 7 shows a display device disclosed in Japanese Patent Application Laid-Open No. 10-170860 as the one in which this optical space is eliminated. In the figure, reference numeral 2 denotes an ocular side microlens array (70.8 μm pitch); 3, a transmission liquid crystal display element (76.3 μm pitch); 41, a condensing microlens array (81.8 μm pitch); 42, a collimating microlens array (90 μm pitch); 5, a flat back light; 8, a diffusion hole sheet having openings 9 functioning as micro light-emitting points; S, R, a microlens; P, Q, a transmission liquid crystal display pixel; E, an eyeball of an observer; and O, a pupil of the eyeball. This display device has an ocular optical system including a microlens for guiding irradiated light from each pixel to the eyeball.

However, this is for providing a thin display device with an increased efficiency of utilizing light as an HMD and is not suitable for observation of a screen with binocular vision at a remote distance at all.

That is, if the microlenses 2 are disposed on the surface side of the liquid crystal display element 3 as shown in FIG. 7, when it is attempted to observe the screen with binocular vision from a remote position, a virtual image screen is displayed in a position remote from the surface of the display element by a lens action of the microlenses 2 despite a state in which optical axes of both eyes intersect on the surface of the display element (display surface) due to vergence. Thus, the screen is observed doubly.

Consequently, the display screen cannot be observed favorably at a distance remote from the display surface. In addition, since overlap of the microlenses and pixels is eccentric, crosstalk in which light of neighboring openings enters an opening occurs to deteriorate the image. Further, moiré occurs due to boundaries of the microlenses and pixel boundaries of the display element to deteriorate the image.

FIG. 8 shows a display device disclosed in Japanese Patent Application Laid-Open No. 5-328261 and Japanese Patent Application Laid-Open No. 6-43391. In the figure, reference numeral 81 denotes a field lens; 82, microlenses; 83, an image display device; and E, an eyeball. The display device of this figure can display an image compactly and with a high resolution as an image for an HMD. However, since the field lens is used, a display screen cannot be observed at a remote distance. In addition, since the microlenses are arranged on a surface side of the display device as a part of an ocular optical system, moiré occurs in boundaries of the microlenses and boundaries of pixels. Therefore, the display device is not suitable for screen observation with binocular vision at a remote distance.

As described above, the means for observing a magnified virtual image cannot cope with screen observation at a remote distance.

SUMMARY OF THE INVENTION

The present invention has been devised in view of the above and other drawbacks and, it is an object of the present invention to provide a display device with which magnified observation of displayed contents with monocular vision at a close distance can be performed and for which reduction in weight and thickness can be realized.

In addition, it is another object of the present invention to provide a display device with which both the above-described magnified observation with monocular vision at a distance closer than a near point and nonmagnified observation with binocular vision at a remote distance can be performed.

Therefore, according to the present invention, there is provided a display device comprising: self-light-emitting type image displaying means that has pixels arranged two-dimensionally; micro light-emitting points that correspond to each pixel of the image displaying means and exist in a part of the pixel; and a micro optical element that guides irradiated light from each of the micro light-emitting points arranged two-dimensionally, in which optical axes connecting each of the micro light-emitting points and the micro optical element corresponding to the micro light-emitting point substantially intersect in a predetermined point closer than a near point of an eye, and in which the micro optical element is arranged so as to focus a virtual image of the micro light-emitting point corresponding to the micro optical element in a position that is a least distance of distinct vision or more apart from the predetermined point.

DESCRIPTION OF THE PREFERRED EMBODIMENTS

Figure 1:
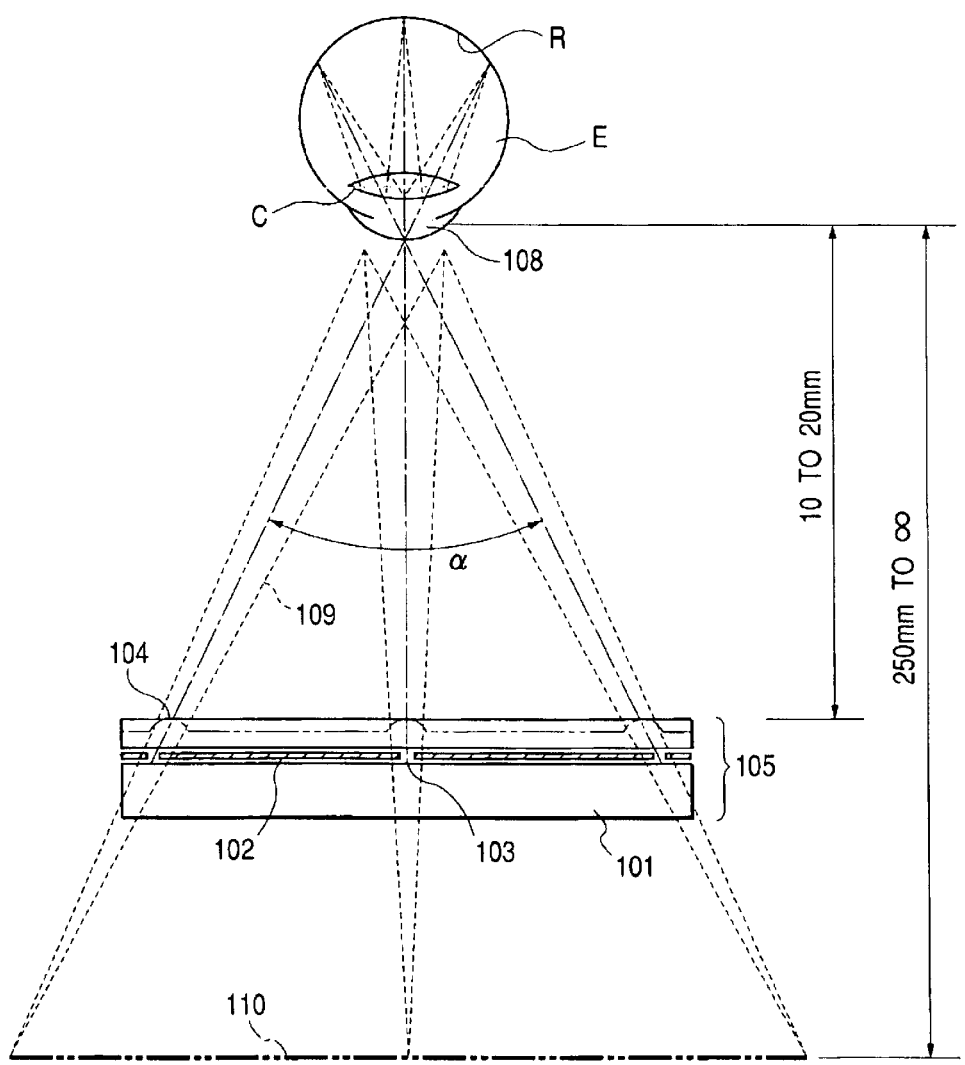
FIG. 1 shows an optical principle that allows magnified display in a display device in accordance with Example 1 of the present invention.

An embodiment mode of the present invention will be hereinafter described.

A first display device in accordance with the present invention has self-light-emitting type image displaying means having pixels arranged two-dimensionally and a micro optical element that has micro light-emitting points in a part of the pixels in association with each pixel of the image displaying means and guides irradiated light from each of the micro light-emitting points arranged two-dimensionally. In the display device, optical axes connecting each micro light-emitting point and the micro optical element corresponding thereto (i.e., light passing through each optical center of them) substantially intersect at a predetermined point closer than a near point of an eye, and the micro optical element focuses a virtual image of the micro light-emitting point corresponding thereto in a position that is a least distance of distinct vision or more apart from the predetermined point. For example, as in this embodiment, if a microspot is arranged in a state in which a distance between a pupil surface of an observer and micro light-emitting points of the microspot is shorter than a near point distance of an eye, optical axes of lights reaching the pupil from the respective micro light-emitting points arranged in the entire area in the microspot through the micro optical element intersect on the pupil surface.

In an average eye, a point called a near point is assumed to be in a range of 80 mm to 100 mm from a pupil of the eye, and a least distance of distinct vision is 250 mm. Therefore, in a general purpose display device, it is sufficient to set a distance between the display surface and a pupil (eye), which is a predetermined point, at approximately 5 to 50 mm and set a distance from the predetermined point to a position where a virtual image of micro light-emitting points is focused at 250 mm to ∞, preferably 1 to 5 m.

In a display device for causing an observer to observe a magnified virtual image as in the conventional HMD, an ocular optical system is disposed on the observer side of the display surface to cause the observer to observe a virtual image of the display surface with the display surface assumed to be an object surface. According to the present invention, the image displaying means and the micro light-emitting points are arranged in the back of the micro optical element to cause an observer to observe a group of virtual images of the micro light-emitting points magnified by the micro optical element. That is, the display device of the present invention causes the observer to observe a magnified virtual image of an image created by the group of the micro light-emitting points with a surface on which the micro light-emitting points are arranged assumed to be an object surface. In this way, according to the present invention based on thought different from that in the past, the ocular optical system for creating a magnified virtual image becomes unnecessary and the display device can be made thin and light.

A second display device in accordance with the present invention comprises, in addition to the construction of the first display device, barrier means that can be switched to a state in which light of the self-light-emitting type displaying means is transmitted through openings arranged two-dimensionally corresponding to each pixel and a state in which the light is transmitted through the entire surface of the displaying means; and a micro optical element that is capable of switching to a microlens formed state and a flat state in association with the barrier means.

According to this construction, the micro optical element has a function of a microlens in the state in which the barrier means transmits the light of the displaying means through the openings, the second display device comes to have the identical construction as the first display device, and display for magnified observation at a distance closer than a near point of an eye with respect to the display surface is displayed. On the other hand, the micro optical element is switched to be nonrefractive in the state in which the barrier means transmits the light of the image display device through its entire surface, and the image display element can be subjected to nonmagnified observation from a position that is a least distance of distinct vision or more apart from the display device.

Figure 5:
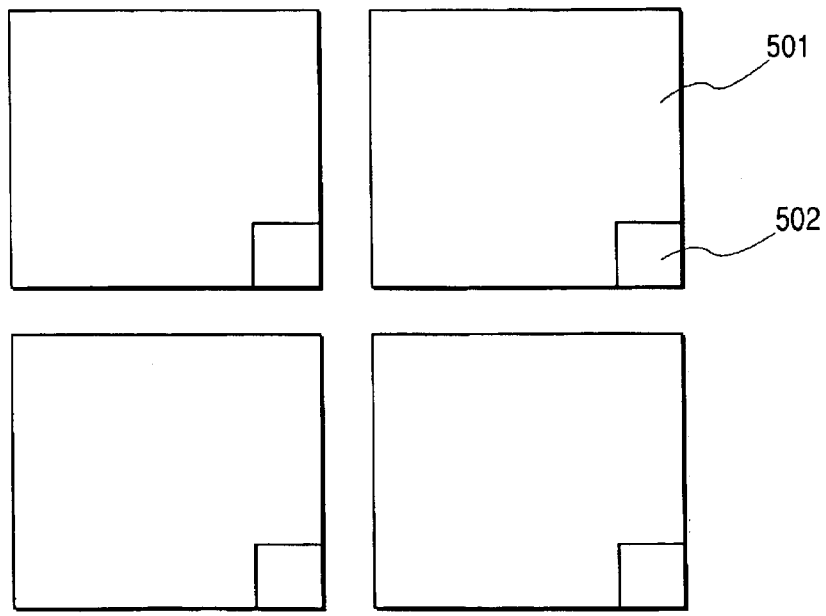
FIG. 5 is a schematic view showing pixels and micro light-emitting areas.

A third display device in accordance with the present invention comprises, in addition to the construction of the first display device, micro light-emitting point areas that are provided in a part of the pixels corresponding to each pixel of the self-light-emitting type displaying means, and are made to be capable of switching to a state in which a second image is displayed with only two-dimensionally arranged light-emitting points emitting light (the other portions excluding the micro light-emitting point area in one pixel do not emit light or are displayed in black) and a state in which a first image is displayed with emitting light on the entire surface; and a micro optical element that is capable of switching to a microlens formed state and a flat state corresponding to the micro light-emitting point areas. In the present invention, the terms "micro light-emitting areas" and "micro light-emitting point area" are used. These terms indicate the same area, but are conveniently distinguished in that the term "micro light-emitting area" indicates a non-light-emitting state and the term "micro light-emitting point area" indicates a light-emitting state. In the case of the entire surface display, the first displayed image and the second displayed image are required to be the same. If these are not the same, two images are displayed overlapping with each other. Since an area of the micro light-emitting area is small compared with the entire screen, an image from the micro light-emitting areas becomes weak. Therefore, it is preferable that overlapping images do not exist. However, even if the images are not made the same, the images do not overlap with each other if the micro light-emitting areas are black. In addition, if the area of the micro light-emitting areas is extremely small compared with a pixel area, the micro light-emitting areas may be displayed in black, that is, the other portion excluding the micro light-emitting point areas may be changed to the light-emitting state (this is called an entire surface light-emitting state). This will be further described with reference to FIG. 5. FIG. 5 schematically shows pixels viewed from above the pixel surface. In the figure, four pixels 501 are shown. The pixels 501 have micro light-emitting areas 502 in their pixel surfaces, respectively. The micro light-emitting areas 502 are smaller than the pixels 501 in terms of an area. Although the micro light-emitting areas 502 are provided at corners of the pixels 501 in the figure, they may be arranged in a portion other than the corners in the pixels 501 as appropriate.

According to this construction, the micro optical element has a function of a microlens in the light-emitting state of the micro light-emitting areas of the displaying means, that is, the micro light-emitting point areas, the displaying means has the identical construction with the first display device, and display for magnified observation at a distance closer than a near point of an eye with respect to the display surface is displayed. On the other hand, the micro optical element is switched to be nonrefractive in the entire surface lightemitting state of the displaying means, and the image display element can be subjected to nonmagnified observation from a position that is a least distance of distinct vision or more apart.

This will be hereinafter described more in detail. A display device in accordance with a preferred embodiment of the present invention is constituted by a barrier element that is controlled to be switched to an entire surface transmission state and a rectangular opening formed state in which rectangular micro openings are arranged in a matrix shape with respect to irradiated light from image displaying means using a self-light-emitting type organic EL; and a flat element (in a microlens formed state) of a variable refractive index in which there is generally focused on each opening in the rectangular opening formed state of the barrier element.

Figure 6A:
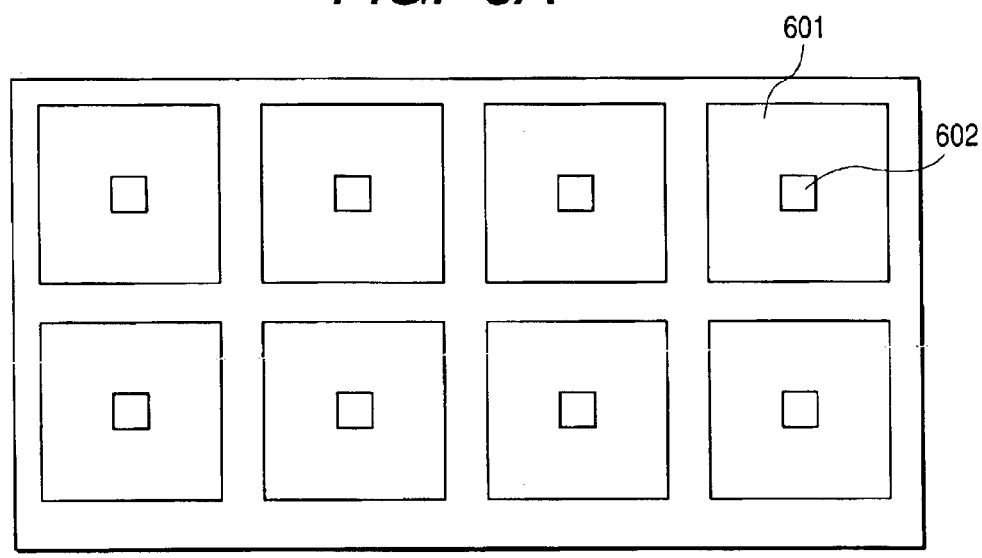
FIGS. 6A and 6B are schematic views illustrating barrier elements.
Figure 6B:
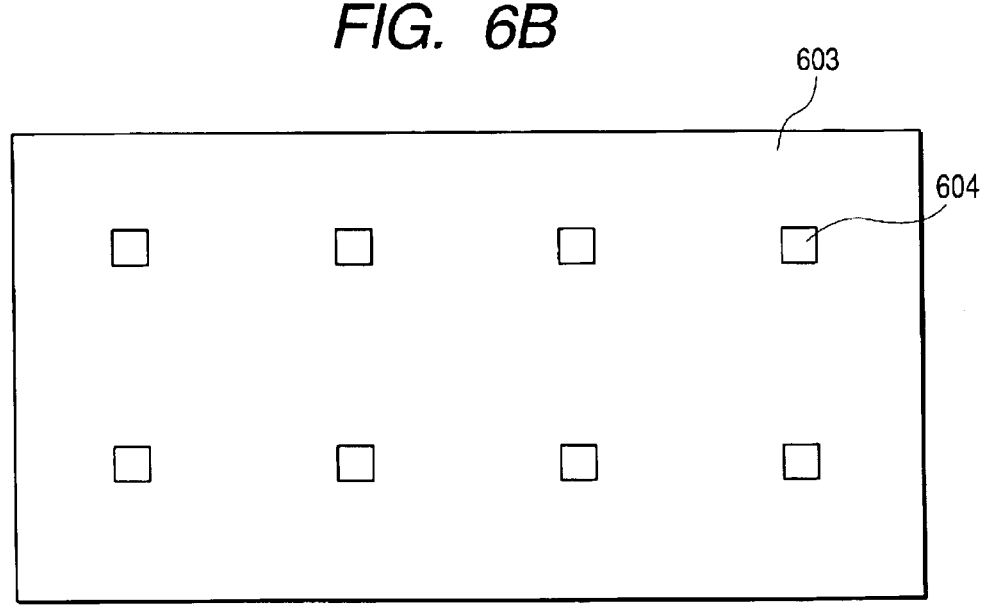
Figure 7:
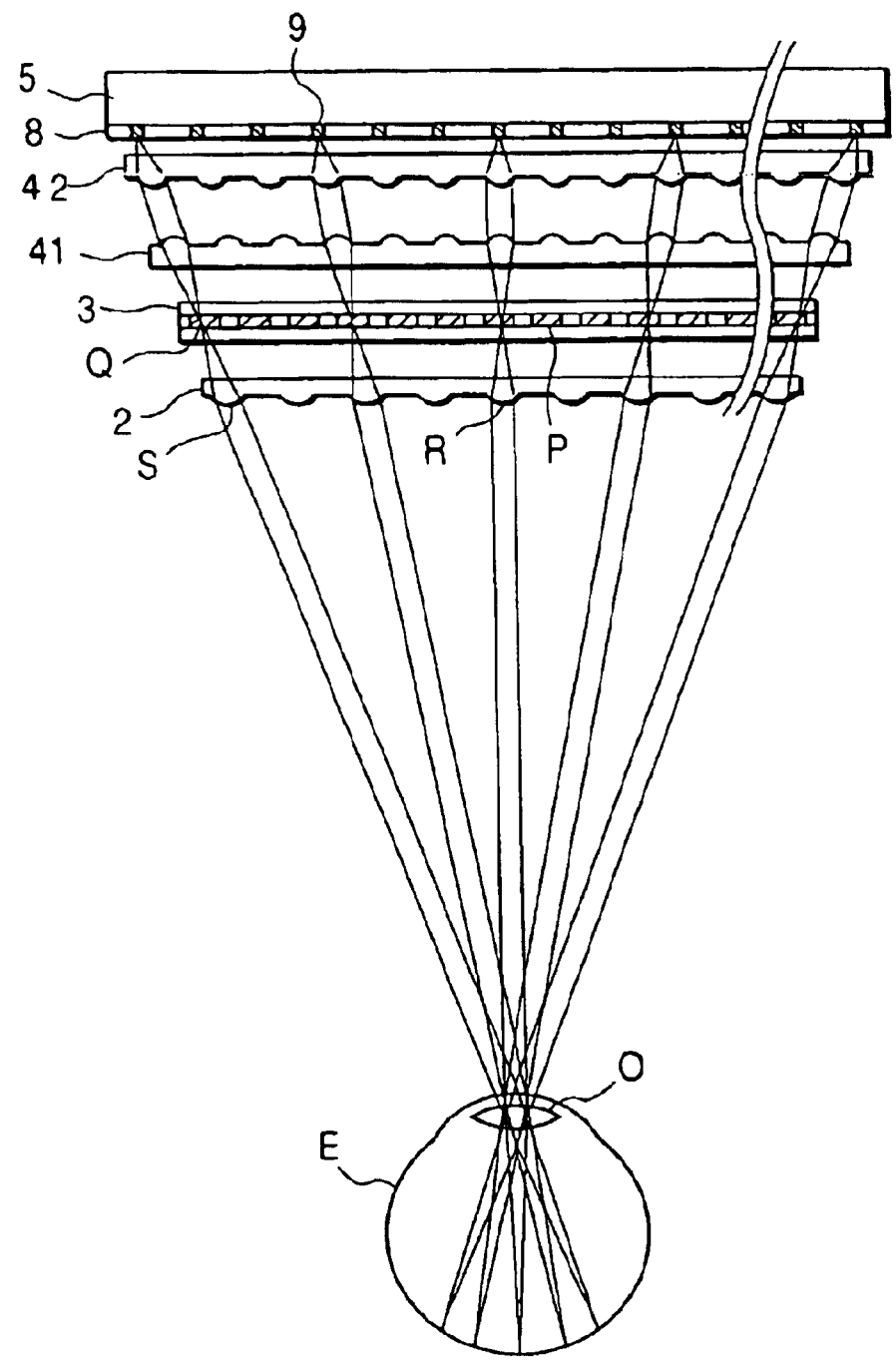
FIG. 7 shows an example of a display device having an ocular optical system including microlenses for guiding irradiated light from each pixel to an eyeball as a display device for an HMD.
Figure 8:
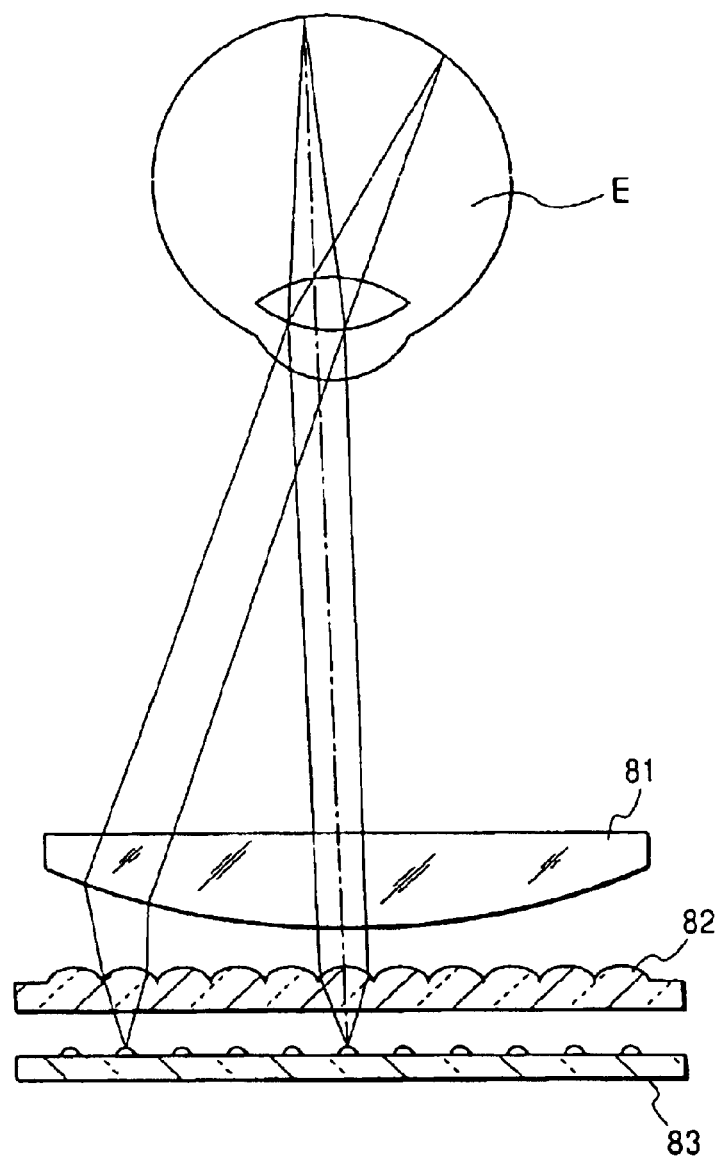
FIG. 8 shows an example of a display device in which a field lens is used as a display device for an HMD.

The barrier element will be described. FIGS. 6A and 6B schematically show a surface opposed to pixel surfaces among surfaces of the barrier element. FIG. 6A shows a case in which the barrier element is in an entire surface transmission area state. In addition, FIG. 6B shows a nontransmission state of the entire surface transmission area and a state in which the micro opening areas are open. In FIG. 6A, entire surface transmission areas 601 correspond to the pixel surfaces. In the figure, eight entire surface transmission areas are shown. In addition, micro opening areas 602 are provided inside the surfaces of the entire surface transmission areas 601. As shown in FIG. 6B, if the entire surface transmission areas are in the nontransmission state, the entire surface transmission areas 601 become nontransmissive, that is, a barrier portion 603. FIG. 6B shows that micro opening areas 604 are provided inside the barrier portion 603. In this way, in the present invention, the entire surface transmission areas 601 of the barrier element can be switched to the nontransmissive barrier portion 603. It is needless to mention that the barrier portion 603 can switch to the entire surface transmission area 601.

In this state, micro openings are arranged in a focal length of a microlens, and light emitted from the micro openings is converted into a substantially parallel beam flux by the microlenses. Micro spotlight is formed in this way.

This optical axis is focused on generally one point on a pupil surface of one eye that is brought close to a short distance (a distance shorter than a near point) at which the eye cannot come into focus from the display surface of the organic EL display element due to physiological reasons. Thus, a pixel that corresponds to a microlens corresponding to each rectangular opening is arranged such that optical axes are focused on one point on the pupil surface.

In addition, if a second barrier element, which is controlled to be switched to the entire surface transmission state and a larger rectangular opening formed state, is inserted between a first barrier element and a flat element of variable refractive index (i.e., this may be referred to as variable refractive force) in order to increase directivity of the micro spotlight, crosstalk is reduced and a better image display is achieved.

By focusing the microlens generally in the vicinity of the rectangular opening, a virtual image of the opening can be formed at a distance where the eye can come into focus (e.g., 250 mm to ∞). That is, since the pupil approaches the display screen too closely, an observer cannot observe the surface of the screen and, as a result, observes a virtual image, and can observe a magnified screen.

A size of the virtual image (display screen) depending on a distance between the display screen and the pupil surface is determined according to a maximum incident angle of the beam flux of the micro spotlight on the pupil. The size is determined such that a magnification of each pixel by the microlens and a magnification of the display screen are independent from each other, but the openings do not overlap with each other in neighboring pixels.

Therefore, given that a distance from the pupil surface of the eyeball to the display screen is L, a size of a microlens is D (e.g., a diagonal length of the microlens is D), a focal length of the microlens is f, and a diagonal length of the opening corresponding to the microlens is W, it is sufficient if $W \leq f \times D/L$ in the case in which a distance from the pupil surface to the surface of the virtual image is large enough.

In addition, in the case in which the screen is observed with binocular vision from a remote position, the barrier element is switched to the entire surface transmission state to eliminate the function of the micro spotlight, and the flat element of variable refractive index is switched to nonrefractive in association with the barrier element. Then, the display surface of the organic EL display element is directly observed.

That is, in this embodiment, in the case in which a screen of a self-light-emitting type compact display panel is observed, screen display is switched to a micro spotlight method and an ordinary screen display. Then, in the state in which an observer looks into the screen with one eye placed adjacent to the screen, the screen display is switched to the micro spotlight method to allow observation of a magnified virtual image of the rectangular opening. In addition, in the case in which the screen display is switched to the ordinary screen display, observation of the display screen with binocular vision at a remote distance is allowed. Consequently, magnified observation of a compact screen as used in a cellular phone etc. is allowed.

In this embodiment, the microlens is constituted by, for example, the flat element of a variable refractive index. As the flat element of a variable refractive index, a liquid crystal panel element is used. As an example of the liquid crystal panel element, there is an element that has a plurality of pairs of electrode substrates having transparent circular pattern electrodes arranged in a matrix shape and liquid crystal provided between the electrode substrates. This liquid crystal panel is formed by superimposing the electrodes opposed to each other via a polymer spacer and enclosing the liquid crystal in a gap formed by the polymer spacer.

An identical voltage is applied to all the circular patterns simultaneously to generate an unequal electric field between the opposing circular patterns, and liquid crystal molecules along this electric field are re-oriented to generate a refractive index distribution to bring the liquid crystal panel element into a microlens state. On the other hand, when the voltage is removed, the screen display can be switched to the flat state.

Since optical characteristics change by changing the applied voltage, the liquid crystal panel element can be used with the voltage set at a voltage with which a focus of this microlens substantially matches a micro light-emitting point.

For example, a predetermined part of self-light-emitting type display pixels (e.g., organic EL) forms point images, which constitute an image as a whole, as a micro light-emitting point. At the same time, a voltage is simultaneously applied to each of the circular pattern electrodes of the liquid crystal microlens, and the liquid crystal panel element comes to be in the microlens state and forms a magnified virtual image of micro point images at a least distance of distinct vision. In this case, a position of the predetermined point is determined such that optical axes connecting a light-emitting point of the predetermined part of the display pixels and the microlenses intersect at one point on the pupil brought close to the screen.

On the other hand, when the self-light-emitting type display pixels emit light on the entire surface and form an image as a whole, the applied voltage of the liquid crystal microlenses is removed and the liquid crystal microlenses act as an ordinary transparent flat plate. Therefore, an ordinary display screen (nonmagnified image) can be seen.

In this case, the micro light-emitting point desirably emits light in the same state as the light-emitting state of a pixel to which it belongs. However, even if the micro light-emitting point is in the non-light-emitting state, the image does not have a practical problem in terms of visual recognition if the other parts of the pixel to which the micro light-emitting point belongs emit light in a very large area. In addition, the liquid crystal panel element can be used also as the barrier element.

Further, if the barrier element is not used, a micro light-emitting area is provided in a part of a pixel of a self-light-emitting type organic EL display element. Then, it is possible to select a case in which only this area is made a light-emitting point and a case in which the entire surface of the organic EL display element is caused to emit light. In the former case, a micro spotlight is formed between the micro light-emitting area and the flat element of variable refractive index. Moreover, in order to increase directivity of irradiated light from the micro spotlight, it is preferable to arrange the barrier element, which comes to be in the opening formed state at the time of micro area light emission, between the surface of the self-light-emitting type display element and the flat element of a variable refractive index. The barrier element is brought into the entire surface transmission state at the time of entire surface light emission.

In order to cope with color display of the display screen, openings corresponding to color light-emitting portions of the three primary colors forming each pixel, respectively, or microlenses corresponding to the micro light-emitting areas are provided. Alternatively, openings containing the three primary colors or the micro light-emitting areas and the microlenses of the three primary colors may be provided in boundaries of the color light-emitting portions of each pixel.

Moreover, preferably, a light-emitting state in a case of monocular vision in proximity and ordinary display for binocular vision in a remote position in the display device are made switchable by a hardware switch provided outside the display device, click of displayed contents as a software switch, a sensor for detecting a proximity state of a face or a voice recognition sensor. Consequently, magnified display contents with monocular vision proximate to the display device and screen display contents with binocular vision in a remote position may be switched.

Note that, although the opening of the present invention is described as rectangular as an example in this embodiment and the following Examples, it may not always be rectangular but may be, for example, circular.

EXAMPLE 1

FIG. 1 shows an optical principle that allows magnified display in a display device in accordance with Example 1 of the present invention. In the figure, reference numeral 101 denotes a self-light-emitting type display element; 102, a barrier element that is capable of controlling to be switched to an entire surface transmission state and an opening formed state; and 103, rectangular openings of the barrier element 102 in the opening formed state. Reference symbol 104 denotes a flat element of a refractive index control type. Focuses of microlenses in a microlens formed state generally match the rectangular openings 103. A micro spotlight 105 is constituted by the self-light-emitting type display element 101, the rectangular openings 103 of the barrier element 102 in the opening formed state and the microlenses. In addition, reference numeral 108 denotes a pupil surface of an eyeball E; 109, beams; 110, a virtual image; R, a retina; and C, a crystalline lens.

When the barrier element 102 is in the opening formed state, beam fluxes of irradiated light from each micro spotlight (light that has passed through the rectangular openings 103 and the microlenses) are arranged so as to impinge on the pupil 108 of one eye E that is brought close to a short distance (a distance closer than a near point, e.g., 10 to 20 mm) at which the eye cannot come into focus from the display screen of the self-light-emitting type display element 101 due to physiological reasons.

In this example, an angle α formed by the beam fluxes from pixels on outermost sides of the self-light-emitting type display element 101 results in a magnified size of the display screen. In this example, α is assumed to be 30° (screen diagonal length).

Given that a distance from the pupil surface of the eyeball to the rectangular openings 103 is L, a size of a microlens is D, a focal length of the microlenses is f, and a size of the rectangular openings is W, $W \leq f \times D/L$. In this way, the virtual images of neighboring pixels are prevented from overlapping with each other.

EXAMPLE 2

Figure 2:
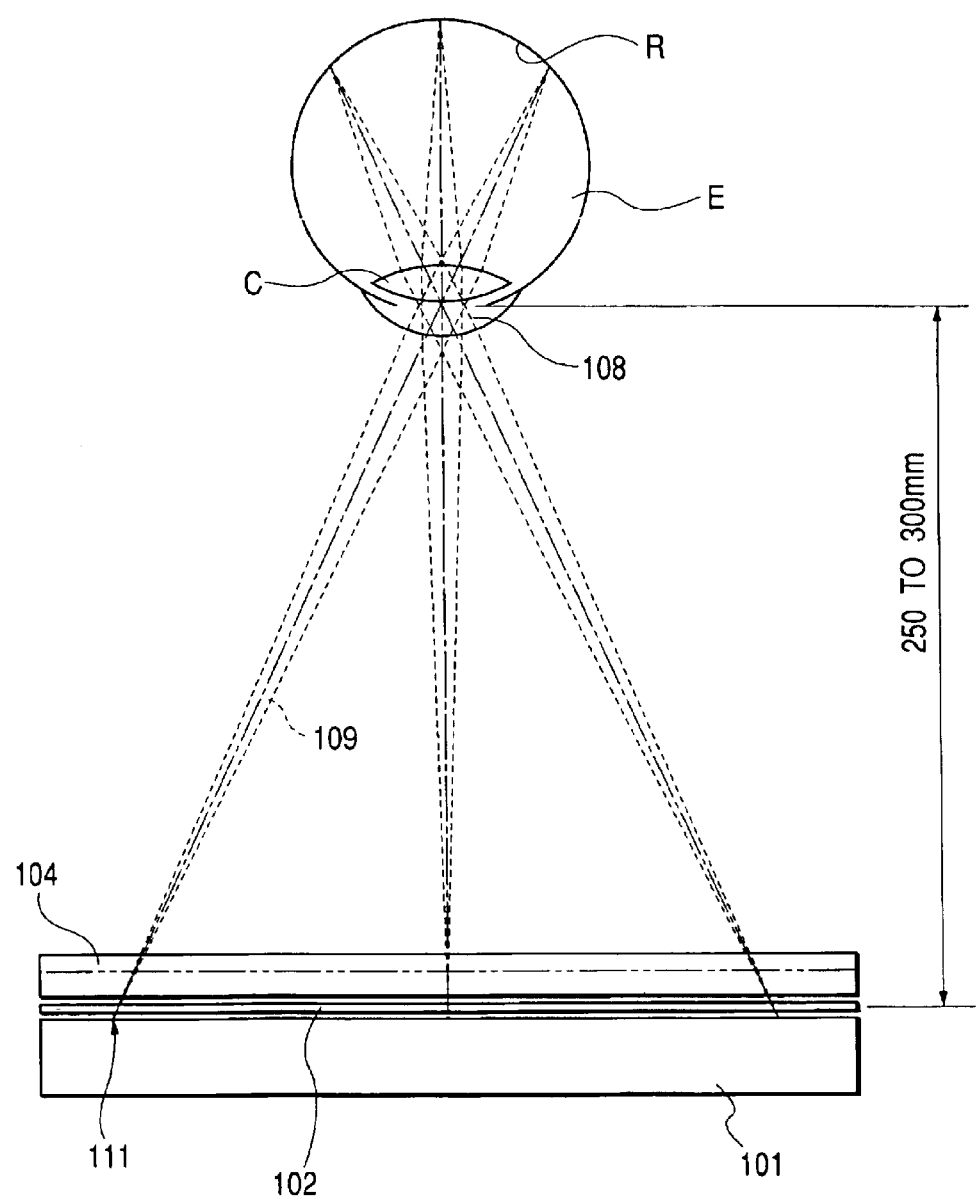
FIG. 2 shows an optical principle that allows observation of nonmagnification in a display device in accordance with Example 2 of the present invention.

FIG. 2 shows an optical principle that allows nonmagnified display in a display device having the identical construction with the display device in accordance with Example 1 of the present invention. In this example, the barrier element 102 is switched to the entire surface transmission state and the flat element of a refractive index control type is switched to a non-refractive state, whereby it becomes possible to perform nonmagnified observation of the display screen of the self-light-emitting type display element with binocular vision from a position that is a least distance of distinct vision or more apart from the display screen.

In the figure, a beam 109 emitted from the self-light-emitting type display element 101 was transmitted through the flat element 104 of the refractive index control type switched to the non-refractive state, and the entire image on the display screen could have been observed with binocular vision at a remote distance at which the eye could physiologically come into focus. Reference symbol 111 denotes a focus position. Note that, in this figure and the following figures, the same reference symbols as those in FIG. 1 denote the same parts, and explanation of the parts will be omitted.

EXAMPLE 3

Figure 3:
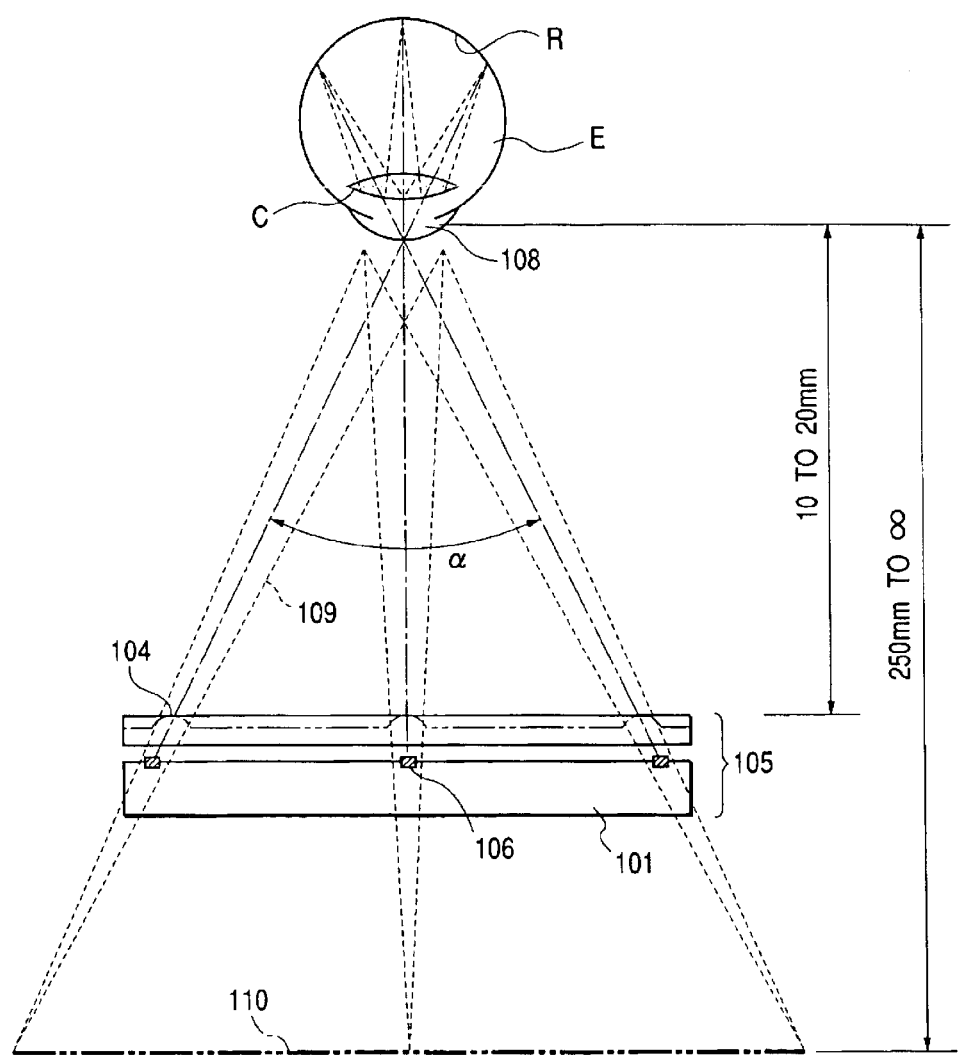
FIG. 3 shows an optical principle that allows magnified display in a display device in accordance with Example 3 of the present invention.

FIG. 3 shows an optical principle that allows magnified display in a display device in accordance with Example 3 of the present invention. In the figure, reference numeral 101 denotes a self-light-emitting type display element that is provided with micro light-emitting points in a part of its pixels and is capable of controlling to be switched to an entire surface light-emitting state and a light-emitting state of the micro light-emitting points.

Reference symbol 106 denotes rectangular micro lightemitting type points in a part of the self-light-emitting display element in the light-emitting state of the micro light-emitting points.

Reference symbol 104 denotes a flat element of the refractive index control type. Focuses of microlenses in a microlens formed state generally match the micro lightemitting points. A micro spotlight 105 is constituted by the self-light-emitting type display element 101, the micro lightemitting points 106 of the self-light-emitting type display element in a micro light-emitting point formed state and the microlenses of the flat element 104 of the refractive index control type. Reference symbol 108 denotes a pupil surface of an eyeball E.

When the self-light-emitting type display element 101 is in the light-emitting state of the micro light-emitting points 106, beam fluxes of irradiated light from each micro spotlight 105 (light that has passed through the micro lightemitting points 106 and the microlenses) are arranged so as to impinge on the pupil 108 of one eye E that is brought close to a short distance (a distance closer than a near point, e.g., 10 to 20 mm) at which the eye cannot come into focus from the display screen of the self-light-emitting type display element 101 due to physiological reasons.

In this example, an angle α formed by the beam fluxes from pixels on outermost sides of the self-light-emitting type display element 101 results in a magnified size of the display screen. In this example, α is assumed to be 30° (screen diagonal length).

Given that a distance from the pupil surface of the eye to the rectangular micro light-emitting points 106 is L, a size of the microlenses in the formed state is D, reference numeral 104 denotes a flat element of the refractive index control type, a focal length of the microlenses in the microlens formed state is f, and a size of the rectangular micro light-emitting points is W, $W \leq f \times D/L$. In this way, the virtual images of neighboring pixels are prevented from overlapping with each other.

In this example, the self-light-emitting type display element 101 is switched to the entire surface light-emitting state, and the flat element 104 of the refractive index control type is switched to the non-refractive state. Consequently, it becomes possible to perform nonmagnified observation of the display screen of the self-light-emitting type display element with binocular vision from a remote position that is a least distance of distinct vision or more apart from the display screen.

That is, specifically, an EL (electroluminescent) element is used as a backlight, and a liquid crystal barrier element that is a part of the self-light-emitting type display element 101 is used to adjust a practical pixel size in the barrier element, whereby a magnified image or an image once as large (nonmagnified image) is represented. More specifically, micro areas are provided as pixels forming a pixel and, if only the micro areas are transmissive, a magnified image is obtained as micro light-emitting points. If the remainder of the pixels is also made transmissive, the entire surface light-emitting state is attained, so that an image once as large is obtained.

Alternatively, if the EL element is directly used as the self-light-emitting type display element, that is, if the barrier element is not used, one pixel area of the EL element and micro areas in the pixel area are provided. Only the micro areas are caused to emit light and become micro lightemitting points, or the remaining parts of the pixels are also caused to emit light to perform the entire surface light emission.

EXAMPLE 4

Figure 4A:
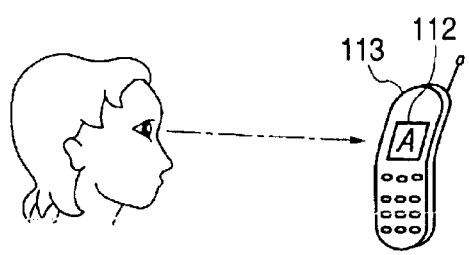
FIGS. 4A and 4B show a portable device of Example 4 in which the display device of the present invention is used as a display screen.
Figure 4B:
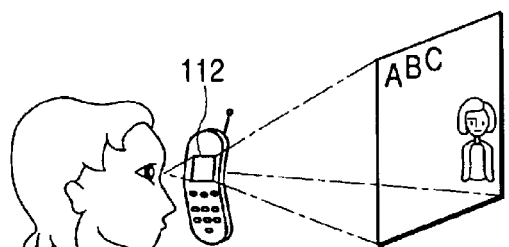

FIGS. 4A and 4B show an example in which a display device 112 in accordance with the present invention is used for a display screen of a portable device. FIG. 4A shows a state in which an observer watches the display screen at a remote distance with binocular vision. FIG. 4B shows a state in which the observer makes the pupil adjacent to the display screen with monocular vision and watches the display screen in magnification display. In the case of FIG. 4B, a state in which a sensor 113 detects that a face has approached is shown. It is needless to mention that the states may be switched in association with a hardware switch provided outside the display element or click of displayed contents as a software switch.

Further, a part of a displayed image is shown in the binocular vision of FIG. 4A, and an example of displaying an entire displayed image is shown in a monocular vision state of FIG. 4B. However, the entire displayed image may be displayed in the binocular vision state and a magnified image of a part of the image may be displayed in the monocular vision state.

In addition, completely different images may be displayed such as displaying a menu in the binocular vision state and displaying details of an item selected from the menu in the monocular vision state, or displaying a screen of an address book in the binocular vision state and displaying a homepage screen of an address selected from the address book in the monocular vision state, or switching a sideways screen and a lengthwise screen depending on the binocular vision and the monocular vision.

According to the present invention described above, reduction in weight and thickness of the display device capable of performing magnified observation of displayed contents with monocular vision at a close distance can realized.

In addition, the display device can switch to observe a display screen of a compact display element in nonmagnification with binocular vision or observe the display screen in magnification with monocular vision with an eye adjacent to the screen. Moreover, in switching to the magnified observation, simple magnification of a small screen, conversion to display of other contents, conversion for display, and the like are also possible. Consequently, a lot of information that could not be fully displayed on a small screen of a portable device or the like conventionally can be observed in magnified display, and convenience of the portable device increases significantly.

What is claimed is:

1. A display device comprising:

self-light-emitting image displaying means having pixels arranged two-dimensionally;

micro light-emitting points corresponding to each pixel of said image displaying means and existing in a part of said pixels; and a micro optical element guiding irradiated light from each of said micro light-emitting points arranged twodimensionally, wherein optical axes connecting each of the said micro lightemitting points and said micro optical element corresponding to said micro light-emitting point substantially intersect in a predetermined point closer than a near point of an eye, said micro optical element is arranged so as to focus a virtual image of said micro light-emitting point corresponding to said micro optical element in a position that is a least distance of distinct vision or more apart from the predetermined points, said image displaying means comprises barrier means having openings, which are arranged two-dimensionally in association with said micro optical element and function as said micro light-emitting points by transmitting light of said image displaying means, said barrier means can be switched to an opening formed state in which light of said image displaying means is transmitted through the openings and an entire surface transmission state, and said self-light-emitting image displaying means and said barrier means are disposed on a side opposite to an observer with respect to said micro optical element.

2. The display device according to claim 1, wherein said micro optical element comprises a flat element of variable refractive index.

3. The display device according to claim 2, wherein said flat element is a liquid crystal panel.

4. The display device according to claim 1, wherein said image displaying means comprises micro areas functioning as said micro light-emitting points in a part of the pixels of said image displaying means, which are arranged two-dimensionally in association with said micro optical element.

5. The display device according to claim 1, wherein, given that a distance from a display surface of said image displaying means to the predetermined point is L, a size of said micro optical element is D and a focal length of said micro optical element is f, a size W of the openings or the micro areas is expressed as $W \leq f \times D/L$.

6. The display device according to claim 4, wherein the light of said image displaying means can be switched to a micro area light-emitting state and an entire surface light-emitting state.

7. The display device according to claim 6, further comprising a hardware switch for switching a light-emitting state of light of said image displaying means and a refractive index state of said micro optical element in association with each other.

8. The display device according to claim 6, further comprising a sensor for detecting a proximity state of a face of an observer with respect to a display surface of said image displaying means, wherein a light-emitting state of said image displaying means and a refractive index state of said micro optical element are switched in association with each other based on a detection output of said sensor.

9. The display device according to claim 1, wherein said barrier means is a liquid crystal panel element.

10. The display device according to claim 1, wherein said image displaying means is an organic electroluminescent element.

11. The display device according to claim 1, further comprising a hardware switch for switching a transmission state of said barrier means and a refractive index state of said micro optical element in association with each other.

12. The display device according to claim 1, further comprising a sensor for detecting a proximity state of a face of an observer with respect to a display surface of said image displaying means, wherein a transmission state of said barrier means and a refractive index state of said micro optical element are switched in association with each other based on a detection output of said sensor.

* * * * *